United States Patent [19]

Haszeldine et al.

[11] 4,002,810

[45] Jan. 11, 1977

[54] PROCESS FOR INSERTION OF HEXAFLUOROPROPENE AT THE ALIPHATIC CARBON-HYDROGEN BOND OF A POLYOLEFIN

[75] Inventors: Robert Neville Haszeldine, Disley; Ronald Rowland, Warrington, both of England

[73] Assignee: Pennwalt Corporation, Philadelphia, Pa.

[22] Filed: Jan. 2, 1975

[21] Appl. No.: 537,977

Related U.S. Application Data

[62] Division of Ser. No. 321,161, Jan. 5, 1973, Pat. No. 3,917,725.

[30] Foreign Application Priority Data

Jan. 14, 1972 United Kingdom ............... 1988/72

[52] U.S. Cl. .................................. 526/22; 526/21; 526/46

[51] Int. Cl.$^2$ .......................................... C08F 8/18

[58] Field of Search .......... 260/878 R, 884, 93.5 A, 260/94.9 H, 88.2 S, 87.5 B, 94.8, 94.7 HA; 526/46, 253, 22

[56] References Cited

UNITED STATES PATENTS

| | | | |
|---|---|---|---|
| 2,549,935 | 4/1951 | Sauer | 260/87.5 B |
| 3,065,157 | 11/1962 | Busse | 260/878 R |
| 3,274,295 | 9/1966 | Baker | 260/94.7 HA |
| 3,444,154 | 5/1969 | Shatz | 260/94.7 HA |

*Primary Examiner*—Paul R. Michl

[57] ABSTRACT

Process for the thermally induced addition of hexafluoropropene to a hydrocarbon compound containing at least one aliphatic carbon-hydrogen bond and which is free of acetylenic and terminal ethylenic unsaturation.

8 Claims, No Drawings

PROCESS FOR INSERTION OF HEXAFLUOROPROPENE AT THE ALIPHATIC CARBON-HYDROGEN BOND OF A POLYOLEFIN

This is a division of application Ser. No. 321,161, filed Jan. 5, 1973, now U.S. Pat. No. 3,917,725.

This invention concerns a novel reaction for the preparation of fluorinated organic compounds and compositions. More particularly this invention concerns a novel reaction for the preparation of fluorinated organic compounds and compositions which consist of or comprise hydrocarbon molecules or macromolecules having one or more terminal and/or pendant

the bracket in the formula

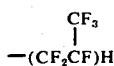

being used to indicate that the hydrogen atom may be attached either to the primary carbon atom, giving rise to a

group, or to the secondary carbon atom giving rise to a

A variety of methods have been proposed hitherto for the preparation of fluorinated organic compounds and compositions. The main practical method has been by the reaction of organic chlorine-containing compounds with various metallic fluorides thereby to replace the chlorine atom or atoms by fluorine. The particular drawback of this method is the cumbersome use of inorganic materials. The method is also limited in its applicability. Other methods have involved electrochemical fluorination and direction fluorination of organic compounds, for example, with hydrogen fluoride, fluorine, or certain inorganic fluorides. Again procedures are involved, yields are often poor, and decomposition products of the organic starting material often predominate.

Also known are various telomerisation reactions in which a telogen is reacted with a fluoroolefin to form telomers containing one or more repeating fluroolefin units. Such reactions proceed by a free radical mechanism involving the initial scission of the telogen to form a free radical, followed by chain propagation and transfer and finally chain termination, to build up telomers of the type R(fluroolefin)$_n$X, where RX is the formula of the telogen. Such processes are disadvantageous in that it is difficult to control the value of $n$ in the final product with any degree of precision, the product usually being a mixture of compounds having a range of values of $n$. Although X in the formula of the telogen is usually halogen, the telomerisation reaction has been extended to telogens where X is hydrogen, see, for example, U.S. Patent Specifications Nos. 2,411,158, 2,433,844, 2,540,088 and 2,599,628. Such telomerisation reactions usually require the presence of a free radical initiator, e.g. a peroxy compound or an azo compound, etc., which may be disadvantageous in that initiator fragments will appear as contaminants in the final product.

Yet another technique of introducing fluorine containing groups into a non-fluorinated base material, particularly polymeric materials, such as polyethylene, polyamides, etc. involves bombarding the base material, whilst in the presence of a fluroolefin. with high energy particles e.g. highly accelerated electrons or nuclear particles such as protons, neutrons, alpha particles, deuterons beta particles etc. Such techniques are disclosed, for example, in U.S. Patent Specification No. 3,065,157. The generation of such high energy particles, of course requires highly sophisticated and expensive equipment.

By contrast with the above techniques, we have found that a hexafluoropropene unit can be inserted into an aliphatic carbon-hydrogen bond, i.e. a bond between a hydrogen atom and a carbon atom which does not form part of an aromatic ring, in a highly controlled manner to give a 1:1 adduct, by the simple technique of heating the compound containing the aliphatic carbon-hydrogen bond with hexafluoropropene in the complete absence of air or other free oxygen containing gas and in the complete absence of any chemical initiator, i.e., free radical-forming chemical catalyst. By 1:1 adduct we mean the insertion of one and only one hexafluoropropene unit into one aliphatic carbon-hydrogen bond in the molecule, i.e.:

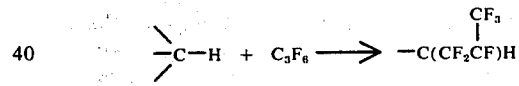

Where the starting compound has more than one aliphatic carbon-hydrogen bond, one molecule of the starting compound may react with two or more molecules of hexafluoropropene to yield a product having a plurality of pendant and/or terminal

groups, although, except for macromolecular materials, products having only one inserted hexafluoropropene unit will generally predominate.

The process of the invention is thus quite distinct from a telomerisation procedure giving rise to terminal groups of the formula

While we do not wish to be bound by an theory, the insertion reaction is believed not to proceed by a reaction mechanism involving initiation by free mono-radicals. Thus, the conditions do not exist for free radical chain propagation leading to adducts having a chain of repeating fluoroolefin units as in a telomerisation procedure.

The insertion according to the invention may be performed on any organic compound containing an aliphatic carbon-hydrogen bond and which is otherwise free of groups or substituents unstable under the conditions of the reaction. In particular, compounds containing terminal ethylenic unsaturation i.e. groups of the formula $CH_2 = CH-$ and $CH_2 = CMe-$ and compounds containing acetylenic unsaturation are to be avoided.

For the purposes of the present invention, the insertion reaction is generally applicable to any hydrocarbon containing at least one aliphatic carbon-hydrogen bond and which is free of acetylenic and terminal ethylenic unsaturation. The reaction is thus applicable to short and long chain alkanes, e.g. methane, ethane, the propanes, butanes, hexanes, octanes and higher paraffins ranging upwards into oils and hydrocarbon paraffin waxes; hydrocarbon polymers, including, in particular, polyolefins such as polyethylenes, polypropylenes, ethylene-propylene copolymers, polystyrene; cycloalkanes, e.g. cyclopropane, cyclobutane, cyclopentane, cyclohexane, methylcyclopentane, methylcyclohexane, decahydronaphthalene; arylalkanes or alkyl aromatics, such as ethylbenzene, amylbenzene, the xylenes, cymene, trimethylbenzenes; cycloalkenes, such as cyclopentene, cyclohexene, cycloheptene and cyclooctene; and non-terminal alkenes such as trimethylethylene, hex-3-ene aand but2-ene.

Turning now to the products of the insertion reaction of the present invention, and leaving aside for the moment macromolecular starting materials, mono-inserted products will generally predominate. Depending on the reactant ratios and on the reaction conditions, however, di- and poly-inserted products can be obtained.

Generally it is found that the reactivity of the aliphatic carbonhydrogen bond in a hydrocarbon decreases in the series tertiary, secondary, primary. In hydrocarbon starting materials, therefore, insertion of the hexafluoropropene unit will occur at a tertiary carbon atom in preference to a secondary atom, and at a secondary atom in preference to a primary atom. Thus, in the thermal insertion between n-butane and hexafluoropropene the major product is $C_2H_5CH(CH_3)CF_2CFHCF_3$ (obtained by insertion into a bond between hydrogen and a secondary carbon atom). Insertion of a second hexafluoropropene unit, however, suggests that the above-stated preference is influenced by the presence of a first-inserted hexafluoropropene unit. Thus, the main product obtained by di-insertion of hexafluoropropene into n-butane is $CF_3CFHCF_2(CH_2)_2CH(CH_3)CF_2CFHCF_3$ (obtained by insertion of the second hexafluoropropene unit at a primary carbon atom).

As has already been indicated, the hexafluoropropene unit can, in theory, be inserted into the C-H bond in either of two directions, giving rise either to a straight or branched chain structure in the terminal or pendant group. In practice, it is found that the insertion reaction of the invention usually leads to the formation of the straight changing grouping, i.e. a terminal or pendant

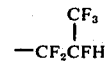

group. With certain starting materials, however, the isomeric grouping is also obtained.

The insertion reaction of the invention provides a route to a wide range of fluorinated organic compounds having an essentially hydrocarbon backbone carrying one or more pendant and/or terminal

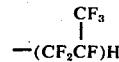

groups. Such compounds have a variety of uses. The products are often liquids and oils with a low freezing point and of good chemical and thermal stability attributable to the presence of the fluorocarbon unit or units. These liquids and oils make useful dielectric liquids, non-corrosive heat exchange media, solvents, lubricants, etc. The products also form a useful starting point for the preparation of other fluorinated organic compounds containing functional groups. In particular, the presence of the hydrogen atom in the terminal or pendant fluorocarbon group renders the group susceptible to dehydrofluorination to form a terminal or pendant perfluoroolefin group, e.g. a perfluoroallyl group; $CF_2CF:CF_2$, or a $>C:CFCFHCF_3$ group. Such as unsaturated groupings open up a route to a wide range of derivatives. More especially, such unsaturated compounds constitute a valuable class of fluorocarbon olefins capable of a variety of chemical reactions, including in the case of compounds containing the perfluoroallyl grouping homo- or co-polymerisation with, for example, other fluoroolefins, such as vinyl or vinylidene fluoride or tetrafluoroethylene, to provide novel fluorocarbon polymers. The route to such unsaturated compounds is illustrated by the following reaction scheme:

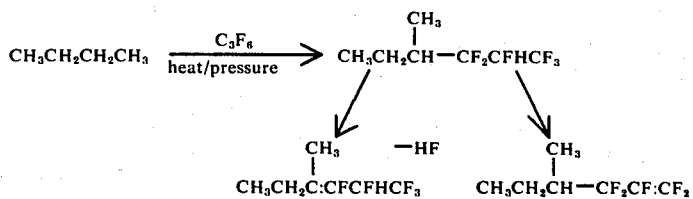

A particularly interesting development of the above procedure is in the double dehydrofluorination of the 1:1 adducts provided by the insertion reaction of the present invention to give fluorinated conjugated dienes useful in the preparation of fluorinated elastomers. Such a route is illustrated by the following reaction scheme:

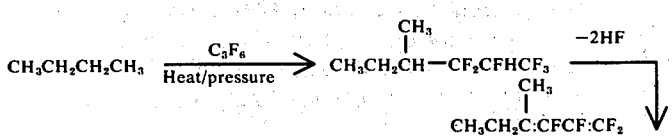

Also of interest are adducts of hexafluoropropene and aromatic compounds e.g. of the formula $RCH_2R^1$ where at least one of R and $R^1$ is an aromatic group, the other, when not aromatic, being hydrogen or an aliphatic hydrocarbon radical free of acetylenic or terminal ethylenic unsaturation. With such starting compounds, the insertion reaction of the invention gives rise to 1:1 adducts of the formula $RR^1CHCF_2CFHCF_3$ which provide a useful starting point for the synthesis of biologically active compounds.

As already indicated, the insertion reaction of the invention is carried out simply by using heat in the absence of air or other free-oxygen-containing gas and in the absence of any chemical initiator. Conveniently the reaction is carried out by heating the reactants together in a closed vessel. The reaction may be performed under an inert atmosphere or in a vessel from which all extraneous material is excluded, for example, by evacuation, followed by vacuum transfer of the reactants into the evacuated vessel. The reaction proceeds satisfactorily in the absence of solvents, but the presence of a solvent is not to be excluded. Indeed, in certain instances, the presence of an inert solvent may be advantageous, for example where a hydrocarbon reactant is used which is solid at the reaction temperature. The insertion reaction proceeds satisfactorily at temperatures in the range about 160° to about 350° C and at pressures of from about 1 to about 250 atmospheres. Preferred conditions include a reaction temperature of at least about 220° C, most preferably temperature in the range 250° C to 300° C, and a pressure of from 10 to 100 atmospheres. Where the hydrocarbon is a volatile low-molecular weight material the reaction may be carried out under continuous flow conditions using a higher contact temperature but a shorter residence period.

Reactant ratios are not critical and are largely dependent upon the degree of insertion desired. A molar excess of hexafluoropropene will favour the formation of di- and poly-insertion products. A molar excess of hydrocarbon will favour the formation of mono insertion products. For highest yields of the mono insertion products hydrocarbon: hexafluoropropene molar ratios in the range 2:1 to 4:1 are preferred.

Turning now to macromolecular hydrocarbon reactants, an important application of the insertion reaction of this invention is in the modification of hydrocarbon polymers, in particular, normally solid, high molecular weight polyolefins such as polyethylene, polypropylene, polyisobutylene, etc. The insertion of pendant

groups into the polymer molecules modifies many important properties of the polymer, e.g. melt flow properties, surface characteristics and moulding properties, without any appreciable cross-linking of the polymer molecules. This is in considerable contrast to the technique discussed hereinbefore of bombarding the polymer in the presence of the fluoroolefin with high energy particles, which technique, involving as it does, the formation of free radical sites, inevitably results in cross-linking of the polymer. In addition, the insertion reaction of the present invention may be used to enhance the chemical and thermal stability of the polymer.

The insertion reaction employing macromolecular hydrocarbon starting material is carried out under substantially the same conditions of temperature and pressure discussed above for lower molecular weight compounds. The amount of hexafluoropropene employed will depend on the degree of insertion desired and this in turn will depend on the modification desired in the final products. The insertion of as little as 1–12% by weight of hexafluoropropene units into the polymer is effective to provide significant changes in melt flow, surface properties and moulding characteristics. Substantially greater changes in the physical and chemical properties of the polymer may be brought about by the insertion of higher, e.g. up to 60%, of hexafluoropropene. The precise effects will differ from polymer to polymer. For example, the insertion of 14% by weight of hexafluoropropene into polyethylene imparts desirable fire resistant and self-extinguishing properties to the base polymer. The insertion of 42–58% of hexafluoropropene into solid high molecular weight polyethylene converts the polymer into a highly fluorinated oil composition highly resistant to oxidative or other chemical degredation and useful as a heat transfer fluid or dielectric.

The invention is illustrated by the following examples.

EXAMPLE 1 — Preparation of
1,1,1,2,3,3-Hexafluoropentane

Ethane (1.03 g., 34.2 mmole) and hexafluoropropene (1.71 g., 11.4 mmole) were heated at 300° for 4 days in a 300 ml. Pyrex ampoule, which had been sealed in vacuo.

The products were separated by conventional vacuum-line techniques and preparative gas-liquid chromatography to give: (i) ethane (0.84 g., 28.3 mmole; 83% recovery); (ii) hexafluoropropene (0.78 g., 5.2 mmole; 46% recovery); (iii) 1,1,1,2,3,3-hexafluoropentane $CH_3CH_2CF_2CHFCF_3$ (0.82 g., 4.6 mmole; 74% recovery based on $C_3F_6$ consumed) (Found: C, 33.4; H, 3.4; F, 64.6%; M, 179. $C_5H_6F_6$ requires C, 33.4; H, 3.4; F, 63.2%; M, 180), b.p. 56°–57° C.

When a reaction between ethane and hexafluoropropene was carried out in a 250 ml. Hastalloy-lined autoclave at a temperature of 280° C and under an initial total pressure of 150 atmospheres, a similar yield (76% based on hexafluoropropene consumed) of 1,1,1,2,3,3-hexafluoropentane was obtained.

EXAMPLE 2 — Preparation of 1,1,1,2,3,3-hexafluoro-4-methylpentane n-Propane-(1.50 g., 34.2 mmole) and hexafluoropropene (1.71 g., 11.4 mmole) were heated together at 295° for 4 days in a 300 ml. Pyrex ampoule to give: (i) hexafluoropropene (0.55 g., 3.68 mmole; 32% recovery); (ii) n-propane (1.13 g., 25.5 mmole; 75% recovery); (iii) 1,1,1,2,3,3,-hexafluoro-4-methylpentane $(CH_3)_2CH.CF_2.CHF CF_3$ (1.20 g., 6.1 mmole; 80% based on $C_3F_6$ consumed) (Found: C, 37.4; H, 4.4; F, 58.1%; M, 194. $C_6H_8F_6$ requires C, 37.2; H, 4.2; F, 58.6%; M, 194) b.p. 79.8° C. Reaction carried out at 330° C between n-propane and hexafluoropropene and on the same scale as above gave a lower yield (62% based on $C_3F_6$ consumed) of 1,1,1,2,3,3-hexafluoro-4-methylpentane.

EXAMPLE 3 — Preparation of 1,1,1,2,3,3-Hexafluoro-4,4-dimethylpentane

Isobutane (1.98 g., 34.2 mmole) and hexafluoropropene (1.71 g., 11.4 mmole) were heated at 295° for 4 days to give: (i) isobutane (1.42 g., 24.4 mmole; 71% recovery); (ii) hexafluoropropene (0.51 g., 3.4 mmole; 30% recovery); (iii) 1,1,1,2,3,3-hexafluoro-4,4-dimethylpentane $(CH_3)_3C.CF_2.CHF.CF_3$ (1.39g., 6.7 mmole; 84% based on $C_3F_6$ consumed) (Found: C, 40.6; H, 4.7; M, 209. $C_7H_{10}F_6$ required C, 40.4; H, 4.8%; M, 208), b.p. 101° C. Similar reactions carried out at 210° C, 260° C and 330° C gave respectively 2% 43% and 51% conversions to 1,1,1,2,3,3-hexafluoro-4,4-dimethylpentane (100%, 80% 52% yields based on $C_3F_6$ consumed).

EXAMPLE 4 — Preparation of 1,1,2,3,3,3-Hexafluoropropylcyclohexane

Cyclohexane (50.4 g., 0.60 mole) and hexafluoropropene (30.0g., 0.20 mole) were heated at 280° for 3 days in a 250 ml. Hastalloy-lined autoclave (mechanically rocked) to give: (i) hexafluoropropene (12.0 g., 0.08 mole; 40% recovery); (ii) cyclohexane (39.3 g., 0.47 mole; 78% recovery), b.p. 81°–83°; (iii) a liquid mixture, b.p. 154°–160°, containing an unidentified component (1.9 g.) and 1,1,2,3,3,3-hexafluoropropylcyclohexane (25.1g., 107 mmole; 90% based on $C_3F_6$ consumed) b.p. 158–159° [Found: C, 46.3; H, 5.2; F, 48.6%; M (mass spectrometry), 234.

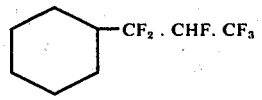

$CHF.CF_3 C_9H_{12}F_6$ requires C, 46.2; H, 5.2; F, 48.6% M, 234] Thermal reactions between hexafluoropropene and cyclohexane carried out at 260° C and 295° C in sealed ampoules and at lower pressures gave lower conversions to 1,1,2,3,3,3-hexafluoropropylcyclohexane (4% and ca. 38% respectively).

EXAMPLE 5 — Preparation of 1,1,1,2,3,3-Hexafluoro-3-cyclopropane

Cyclopropane (9.86 g., 234 mmole) and hexafluoropropene (11.75 g., 78.3 mmole), sealed in vacuo in 250 ml. Hastalloy autoclave and heated at 310° for 4 days, gave hexafluoropropene (10.45 g., 68.3 mmole; 87% recovery), cyclopropane (9.15 g., 222 mmole; 93% recovery), and 1,1,1,2,3,3-hexafluoropropyl-3-cyclopropane (0.8 g., 4.2 mmole; 42% yield based on hexafluoropropane consumed [Found: C, 37.3; H, 3.3%, M (mass spec.) 192. Δ $CF_2$. $CHF.CF_3$, $C_6H_6F_6$ requires C, 37.5; H, 3.1%; M, 192] b.p. 75.2° (isoteniscope).

EXAMPLE 6 — Mono and Double Insertion of $C_3F_6$ into n-Butane

Hexafluoropropene (30.9 g., 0.206 mole) and n-butane (35.9 g., 0.618 mole), sealed in a Hastalloy autoclave (500 ml.) and heated at 325° C (72 h.) gave hexafluoropropene (12.1 g., 80.4 mmole, 28% recovery), N-butane (25.0 g., 0.430 mole, 70% recovery), 1,1,1,2,3,3-hexafluoro-4-methylhexane $CH_3.CH_2.CHMe.CF_2.CHF.CF_3$ (11.35 g., 54.6 mmole, 40%) [Found: C, 40.1; H, 4.6; F, 54.9%; M (mass spectrometry), 208.] $C_7H_{10}F_6$ requires C, 40.4; H, 4.8; F, 54.8%; M, 208/, b.p. 104°–5° C, 1,1,1,2,3,3-hexafluoroheptane $CH_3.CH_2.CH_2.CH_2.CF_2.CHF.CF_3$ (2.14 g., 10.3 mmole, 8%) [Found: M (mass spectrometry), 208], b.p. 101° C, and a less volatile fraction (9.87 g.). The less volatile fraction was shown by g.l.c. and n.m.r. to be mainly 1,1,1,2,3,3,7,7,8,9,9,9-dodecafluoro-4-methylnonane $CF_3.CHF.CF_2.CH_2.CH_2.CHMe.CF_2.CHF.CF_3$ (7.15 g., 20.0 mmole, 27%) [Found: C, 33.7; H, 2.9; F, 63.7%; M (mass spectrometry), 358. $C_{10}H_{10}F_{12}$ requires C, 33.5; H, 2.8; F, 63.7%, M, 358], b.p. 170° C. A second high-boiling component was tentatively identified as 1,1,2,6,6,7,8,8,8,-nonafluoro-2-trifluoromethyl-5-methyloctane $CHF_2.CF(CF_3).CH_2.CH_2.CHMe.CF_2.CHF.CF_3$ (0.93 g., 2.6 mmole, 4%) [Found: M (mass spectrometry), 358].

In particular compounds containing two $C_3F_6$ units linked together were not detected; the absence of such compounds e.g. $C_4H_9.[CF_2.CF(CF_3)]_2.H$ shows that free-radical polymerisation of hexafluoropropene is not involved in the formation of the 2:1 product from hexafluoropropene and n-butane.

EXAMPLE 7 — Preparation of 3-(2,2,3,4,4,4-Hexafluorobutyl)toluene

Meta-xylene and hexafluoropropene (3:1 molar ratio), heated at 290° for 3 days, gave 3-(2,2,3,4,4,4-hexafluorobutyl)toluene:

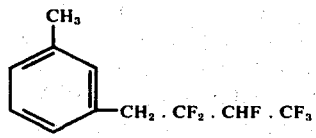

in 70% yield based on hexafluoropropene consumed.

EXAMPLE 8 — Preparation of 1,1,2,3,3,3-Hexafluoropropylcyclopentane

Cyclopentane (65 mmole) and hexafluoropropene (22 mmole) heated at 290° for 2 days gave a 71% yield (based on hexafluoropropene consumed) of analytically and spectroscopically pure 1,1,2,3,3,3-hexafluoropropylcyclopentane:

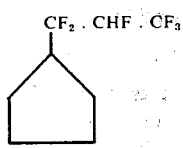

b.p. 132° identical with material prepared by an alternative route.

EXAMPLE 9 — Preparation of 3-(1,1,2,3,3,3-Hexafluoropropyl)cyclohexene

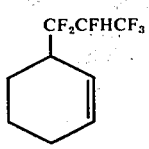

Cyclohexene (2.8 g., 34.2 mmole) and hexafluoropropene (1.71 g., 11.4 mmole), heated at 320° for 4 days in a Pyrex ampoule gave: (i) hexafluoropropene (0.06 g., 0.40 mmole; 4% recovery), (ii) cyclohexene (1.9 g., 23.2 mmole; 67% recovery), b.p. 83°, (iii) a liquid mixture (2.5 g.), b.r. 50°–110°/13 mm. Hg., from which was isolated (preparative g. l. c.) 3-(1,1,2,3,3,3-hexafluoropropyl)-cyclohexene (1.6 g., 6.9 mmole; 63% based on $C_3F_6$ consumed). Found: C, 47.0; H, 4.3; F, 48.5%; M (mass spectrometry), 232. $C_9H_{10}F_6$ requires C, 46.6; H, 4.3; F, 49.1%; M, 232, b.p. 160°–161° C.

EXAMPLE 10

A 300 ml. pressure vessel was charged with 80 grams high molecular weight polyethylene ("Alathon 20 " resin, a product of E. I, DuPont Company). The vessel was closed, evacuated, and 15 g. of hexafluoropropene added by vacuum transfer. The reactants were heated for 12 hours at 290°–300° C to give a polymer of good, clean appearance containing about 1% fluorine. Infrared analysis confirmed that the fluorine is present as a fluorocarbon group covalently bonded to the polymer.

When a film of the fluorine-containing polymer was pressed out between two heated, polished aluminum plates, it produced a clear disc that releases readily from the plates and had an excellent surface finish. In contrast, a sample of the unmodified base resin ("Alathon 20 ") under the same conditions did not flow well and stuck to the plates leaving a rough, pock-marked surface, thus confirming that the described treatment greatly improves the processing characteristics of the polyolefin.

This modified polyolefin was subjected to the solvent-swell test to measure the extent of cross-linking as described in U.S. Pat. No. 3,065,157; a 0.25 gram sample in the form of a film was placed in 5 ml. of α-chloronaphthalene and heated 4 hours at 150° C. The degree of swelling was indicated by the ratio of the liquid absorbed to the initial weight. In this test the modified resins of U.S. Pat. No. 3,065,157 had reduced swelling, indicating cross-linking. In contrast, the modified resin of this invention completely dissolved as does the untreated polymer, indicating the lack of cross-linking.

EXAMPLE 11

Hexafluoropropene is reacted with and inserted into the polyethylene [Alkathene WJG-11 (M.F.2, density 0.92-0.93 g/cc)] at 260 to 300° C for 24 hours and ca. 80 atm. pressure in various proportions as follows:

| % HFP in Polyethylene | Reaction Temp; 24 hours, ° C |
|---|---|
| 1 | 260–270 |
| 2 | 260–270 |
| 3 | 260–270 |
| 5 | 280 |
| 10 | 280–290 |
| 14 | 290 |
| 30 | 290 (4 days) |
| 58 | 290 (14 days) |

The product containing 58% HFP is a viscous liquid whereas the others are solid polymers. The properties of these products, summarized in the following table, show that improvement in flow properties, surface characteristics, and moulding properties can be achieved relative to the unmodified resin, leading to easier fabrication, new uses etc. for the modified resin.

| % HFP in Polymer | Density, G/CC | M.P. ° C. | Melt flow Index at 150° C. | Melt viscosity at 150° C. poise, × $10^5$ | Tensile Strength, psi. | Tensile elastic modulus, psi. | Elongation to Break % | Crystallinity (differential scanner calorimeter) relative to control as 100% | Coefficient of friction on Glass |
|---|---|---|---|---|---|---|---|---|---|
| 0 | 0.927 | 110 | 0.41 | 2.37 | 2160 | 19,100 | 442 | 100% | 0.29 |
| 1 | 0.929 | — | 0.19 | 5.18 | 1910 | 19,300 | 283 | | |
| 2 | 0.929 | — | 0.31 | 3.11 | 1860 | 21,700 | 398 | | |
| 3 | 0.934 | — | 0.39 | 2.50 | 1640 | 18,000 | 383 | | |
| 5 | 0.940 | 107 | | | | | | 86% | 0.34 |
| 10 | | | | | 1040 | 18,300 | 164 | | |
| 14 | | | | | 680 | 12,700 | 40 | | |
| 30 | 1.03 | 92 | | | | | | 19% | 1.04 |

The infrared spectra of the products show absorptions due to C-F bonds which are not characteristic of hexafluoropropene or its dimer, and the presence of covalently-bound fluorocarbon groups can be detected even when insertion has occurred to only a small extent (e.g. $C_3F_6$). The mass spectra of the products also reveal $C_3F_6$ units bonded to hydrocarbon chains, and the $^{19}F$ and $^{1}H$ n.m.r. spectra of products containing the higher percentages of $C_3F_6$ suggest that these units are bonded as the $CF_3.CFH.CF_2$-group.

A reduction in crystallinity accompanies reaction of polyethylene and $C_3F_6$; inspection shows that the products are softer and more flexible than the parent polymer. Plasticization by reaction with $C_3F_6$ is confirmed by the increase in coefficients of friction.

Insertion of hexafluoropropene into polyethylene introduces flame-retardant properties, and polymers which contain more than 14% $C_3F_6$ are self-extinguishing.

The insertion increases the solubility of the resin in common organic solvents as shown by the following table:

| Polymer solubilities at 60° C in mg/100 ml. (or % increase) | | | | |
|---|---|---|---|---|
| | % $C_3F_6$ in Polymer | | | |
| Solvent | 0 | 2 | 3 | 14 |
| 60–80 pct. ether | 1.4 | (+0.4%) | 1.6 | 238 |
| n-octane | (+0.6%) | (+0.6%) | (+0.1%) | 172 |
| benzene | 14.2 | 0.8 | 3.6 | 298 |
| xylene | (+0.2%) | (+0.8%) | (+0.2%) | 304 |
| ethanol | 0.4 | 0.8 | 0.4 | 5.4 |
| triethylamine | (+0.8%) | (+1.6%) | (+1.0%) | 239 |
| chloroform | (+1.4%) | (+1.5%) | (+0.4%) | 500 |

The increased solubilities permit application of the fluorinated resins from solution at relatively low temperatures to paper and fabrics to give coatings thereon having hydrophobic and oleophobic properties.

EXAMPLE 12

Hexafluoropropene was heated with polyisobutylene at 280° for 7 days at 80 atmos. pressure to give a viscous oil containing fluorine.

EXAMPLE 13

Polypropylene powder was heated at 200°–300° for 20–166 hours with a deficit of hexafluoropropene at 20–100 atmos. pressure. At temperatures below 240° there was a slow reaction to give a polymer containing approximately 0.1% $C_3F_6$. At 240° the reaction was faster and gave a product which contained 0.5% of $C_3F_6$. Use of temperatures greater than 240° leads to a soft solid product which contains 10% $C_3F_6$. Mass spectral investigation of these materials reveals the presence of the $CF_3.CHF.CF_2$ group.

EXAMPLE 14

Hexafluoropropene reacts with polystyrene at 250° under conditions as in Example 13 to give a light brown solid polymer which contains 5% by weight of fluorine and is relatively flame-resistant.

We claim:

1. A polymer product comprising a fluorinated, substantially non cross-linked polyolefin selected from the group consisting of polyethylene, polypropylene, polyisobutylene, polystyrene and ethylene-propylene copolymers, said polyolefin having from about 0.1 to about 60%, based on the weight of said polymer product, of pendant groups having the following formula:

$$-(CF_2CF)H \atop | \atop CF_3$$

2. The fluorinated polymer product of claim 1 wherein the polyolefin is polyethylene.

3. The fluorinated polymer product of claim 1 wherein the polyolefin is polypropylene.

4. The fluorinated polymer product of claim 1 wherein the polyolefin is polyisobutylene.

5. The fluorinated polymer product of claim 1 wherein the polyolefin is polystyrene.

6. The fluorinated polymer product of claim 1 wherein said polyolefin has from about 1 to about 12% of said pendant groups.

7. The fluorinated polymer product of claim 2 wherein said polyethylene has from about 1 to about 58% of said pendant groups.

8. The fluorinated polymer product of claim 2 wherein said polyethylene has from about 42 to about 58% of said pendant groups.

* * * * *